Nov. 13, 1928.  1,691,581
T. G. MUELLER ET AL
SAW RIG ATTACHMENT FOR TRACTORS
Filed Nov. 22, 1923  2 Sheets-Sheet 1
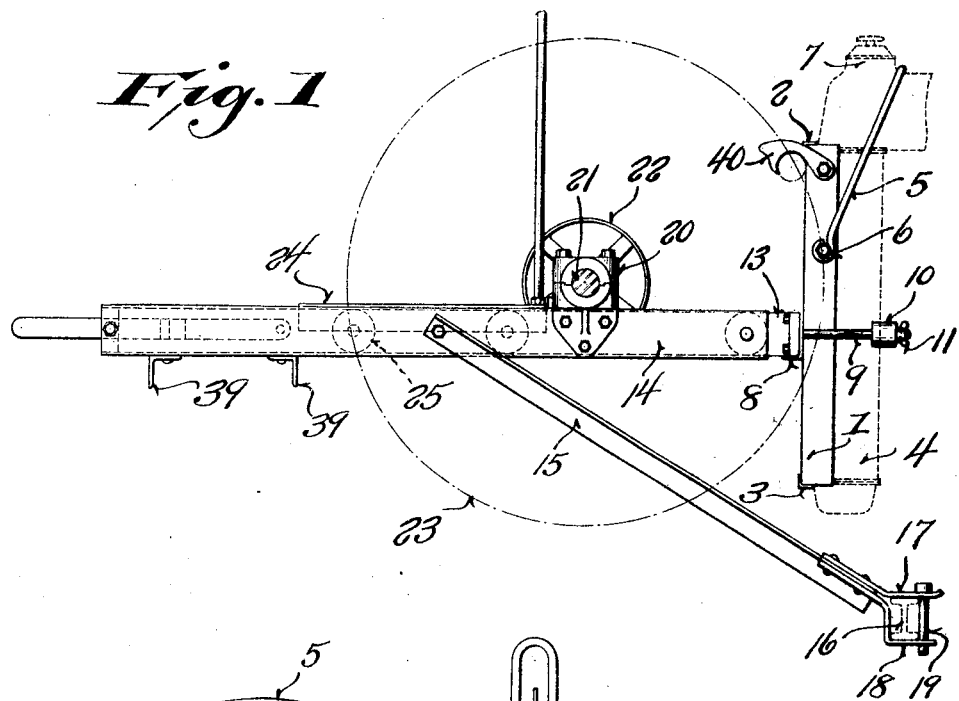
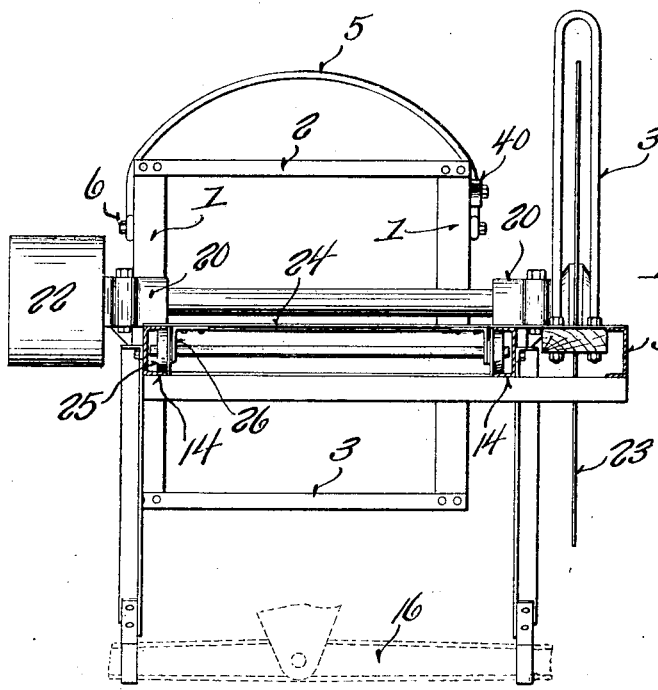
Inventors:
Theodore G. Mueller
Alfred R. Buchholz
Paul O. Dallman
George C. Moerschel
Max G. Kujawski
William H. Schmidt
William C. Dallmann
BY
ATTORNEY.

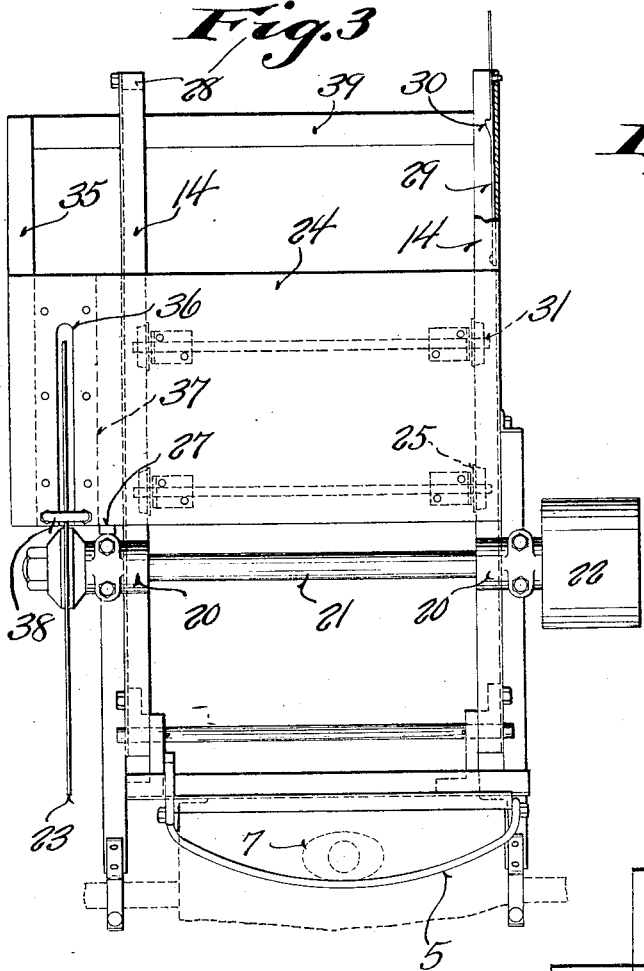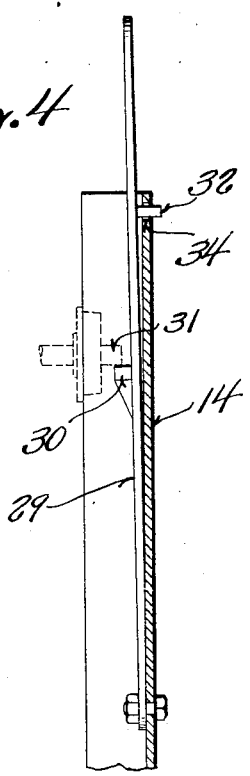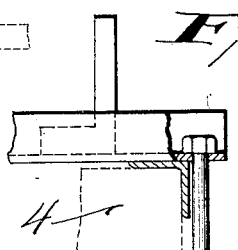

Patented Nov. 13, 1928.

1,691,581

UNITED STATES PATENT OFFICE.

THEODORE G. MUELLER, ALFRED R. BUCHHOLZ, PAUL O. DALLMANN, GEORGE C. MOERSCHEL, WILLIAM C. DALLMANN, MAX J. KUJAWSKI, AND WILLIAM H. SCHMIDT, OF MILWAUKEE, WISCONSIN, ASSIGNORS TO DALLMANN MACHINE AND MANUFACTURING CO., OF MILWAUKEE, WISCONSIN.

SAW-RIG ATTACHMENT FOR TRACTORS.

Application filed November 22, 1923. Serial No. 676,360.

This invention relates to saw rig attachment for tractors.

Objects of this invention are to provide a saw rig which may be quickly attached to a standard type of tractor without requiring any tools for effecting the attachment, which is adequately braced from the tractor and which may be rocked into either an operative or an inoperative position and when in the latter position is adapted to be left upon the tractor while the tractor is moved from point to point.

Further objects are to provide a saw rig attachment for tractors which is so organized that it may be readily driven from the standard driving pulley or take-off wheel of the tractor, which is provided with a reciprocable table adapted to hold the wood to be sawed, which is provided with a self aligning saw guide, and with means to guard against accidental contact of the wood with the saw, and which is provided with a temporary retaining means for holding the work table away from the saw.

An embodiment of the invention is shown in the accompanying drawings, in which:—

Figure 1 is a side elevation of the device showing it in operative position on the tractor.

Figure 2 is a front elevation of the device.

Figure 3 is a plan view of the structure shown in Figure 1.

Figure 4 is a detail illustrating the temporary latching or locking means.

Figure 5 is a further detail showing the means for clamping the device to the front portion or radiator of the tractor.

The device comprises a frame formed of vertical side angle irons 1 which are connected by upper and lower transverse members 2 and 3 which may also, if desired, be of relatively smaller angle irons. This frame, as shown in Figure 1, is adapted to fit over the front of the radiator 4 of the tractor with the side flanges of the angle irons 1 fitting over the sides of the radiator, as shown. A U-shaped strap member 5 has its arms pivotally joined, as indicated at 6 to the angle irons 1, and is adapted to fit over the filling neck 7 of the radiator, as shown in Figure 1, to thus support the device. A transverse channel iron 8 extends across the front of the frame and joins the angle irons 1. This channel iron carries rearwardly projecting bolts 9 which carry lugs 10, such lugs being adjustably held in position by means of wing nuts 11.

It is to be noted that the lugs 10, as may be seen from Figure 5, are provided with ears 12 adapted to engage the rear face of the radiator 4 to thus clamp the frame rigidly in position upon the radiator.

The transverse channel iron 8 carries a pair of lugs 13 to which are pivoted outwardly projecting channel irons 14. These channel irons are each provided with a pivotally joined angle iron or brace 15 which is adapted to extend downwardly from an intermediate portion of each of the channel irons 14 to the front axle 16. It is to be noted from Figure 1 that the members 15 are provided with upper and lower arms 17 and 18 which are apertured and adapted to receive a pin 19. These pins are adapted to be slipped into position when the parts are as shown in Figure 1 and to thus temporarily lock the members 15 to the front axle and to prevent inadvertent disconnection of such members from the axle.

A pair of bearings 20 are secured to the outwardly projecting channel irons 14 and carry the shaft 21. One end of this shaft is provided with a driven pulley 22 adapted to be belted to the usual driving pulley of the tractor, such pulley being commonly known as the power take-off pulley of the tractor. The other end of the shaft is provided with a circular saw 23 which is located exteriorly of the outwardly projecting channel irons 14.

A workplate 24 is supported by means of a plurality of flanged wheels 25 which are suitably journaled in appropriate members 26 carried by the lower side of the workplate. These flanged rollers fit within the inwardly turned channels formed by the channel irons 14, as may be seen from Figure 2, and thus both guide and support the workplate. The workplate 24 is provided with a forward stop 27 which contacts with one of the bearings 20 to thus limit the forward motion of such workplate. Rearward motion of the workplate is limited by means of a stop or plug 28 (see Figure 3) carried by one of the channel irons 14. It is desirable at times to lock the workplate in its outermost position. This is readily accomplished by providing a leaf spring 29 which is bolted to the inner face of one of the channel members and is provided with a slanting cam or lug 30 provided with an abrupt shoulder adapted to engage the projecting portion 31 (see Figure 3) of one of the axles of the rollers 25. This spring 29 is provided with a pin 32 loosely passing through an aperture 34 formed in the channel iron 14 in order to aid in correctly positioning the spring. It is provided with an outer projecting portion adapted to be engaged by a portion of the body of the workman when it is desired to release the work table 24. This work table is provided with a portion which projects beyond the left hand channel iron 14, as shown in Figure 3, and an auxiliary support or guideway 35 which is provided for carrying this projecting portion, as may be seen from Figures 3 and 2.

The projecting portion of the workplate is provided with a slot 36 therethrough and has bolted to the under side thereof a wooden block 37. This wooden block is positioned upon the workplate in its initial integrity and, thereafter, the workplate is slid towards the saw thus allowing the saw to cut its kerf through the block 37 thus insuring proper aligning of the guiding slot and the saw for subsequent work.

It is desirable to provide a guard for the saw to prevent contact of the wood with the saw when the workplate 24 is in its outermost position. This is readily secured by providing an upstanding U-shaped guard 38 (see Figures 2 and 3) which, when the workplate is retracted, prevents the wood from inadvertently engaging the saw.

A convenient way of supporting the auxiliary support or guides 35 is by means of a pair of angle irons 39 which are bolted to the under side of such guide and to the under side of the channel irons 14, as may be seen from Figures 1 and 3.

When it is desired to move the tractor to some other point where sawing is to be done, the pins 19 are withdrawn thus freeing the brace members 15 and permitting the forward frame formed of the channel irons 14 to be swung upwardly about their pivotal union with the lugs 13. When the device is swung upwardly, the shaft 21 is engaged by a pawl 40 pivoted to one of the uprights or channel irons 1, as may be seen from Figure 1, and thus the device may be held in its elevated position and the tractor may be readily driven to the desired point.

It will thus be seen that in effect a portable saw mill has been provided which may be moved from point to point, which may be readily adjusted to operative position, and which may be readily moved into inoperative position and locked in such position.

It will further be seen that a saw rig for a tractor has been provided which may be readily fastened in a very rigid and secure manner to a standard form of tractor without requiring any tools whatsoever.

Although the invention has been described in considerable detail, it is to be understood that the invention may be variously embodied and is, therefore, to be limited only as claimed.

We claim:

1. A saw rig for detachable engagement with the front end of a tractor comprising a frame adapted to contact with such front end, means for supporting such frame, means for clamping said frame to the front end of said tractor, a pair of outwardly projecting members pivotally carried by said frame, a circular saw revolubly carried by said outwardly projecting members, and a workplate carried by said outwardly projecting members and adapted to reciprocate relatively to said members.

2. The combination of a tractor having a front radiator provided with a filling neck and having a front axle, a frame adapted to engage said radiator and having projecting flanges adapted to fit the side of such radiator, a supporting member pivotally carried by said frame and adapted to fit behind said filling neck, means for clamping said frame to said radiator, a pair of forwardly projecting members pivotally carried by said frame, braces pivotally carried by said members and adapted to detachably engage the front axle of said tractor, a circular saw revolubly carried by said forwardly projecting members, and a workplate, mounted for reciprocation with reference to said forwardly projecting members.

3. The combination of a tractor having a front radiator provided with a filling neck, and having a front axle, a frame adapted to contact with said radiator and having side flanges adapted to engage the sides of said radiator, a U-shaped member pivotally carried by said frame and adapted to hook behind said filling neck, a pair of forwardly extending members pivotally supported from said frame, means for temporarily holding said members in an outwardly projecting position, a circular saw revolubly supported by said members, and means for guiding the work to said saw.

In testimony that we claim the foregoing we have hereunto set our hands at Milwaukee, in the county of Milwaukee and State of Wisconsin.

PAUL O. DALLMANN.
WILLIAM C. DALLMANN.
ALFRED R. BUCHHOLZ.
MAX J. KUJAWSKI.
GEORGE C. MOERSCHEL.
W. H. SCHMIDT.
THEODORE G. MUELLER.